US009811778B2

(12) United States Patent
Baughman et al.

(10) Patent No.: US 9,811,778 B2
(45) Date of Patent: Nov. 7, 2017

(54) SOCIAL COLLABORATION IN PROBABILISTIC PREDICTION

(71) Applicant: International Business Machines Corporation, Armonk, NY (US)

(72) Inventors: Aaron Keith Baughman, Silver Spring, MD (US); Brian Marshall O'Connell, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 833 days.

(21) Appl. No.: 14/063,035

(22) Filed: Oct. 25, 2013

(65) Prior Publication Data
US 2015/0120619 A1 Apr. 30, 2015

(51) Int. Cl.
G06N 7/00 (2006.01)
(52) U.S. Cl.
CPC .................... G06N 7/005 (2013.01)
(58) Field of Classification Search
None
See application file for complete search history.

(56) References Cited

U.S. PATENT DOCUMENTS

| 7,519,564 | B2 † | 4/2009 | Horvitz |
| 7,519,566 | B2 † | 4/2009 | Priogin |
| 7,818,276 | B2 † | 10/2010 | Veillette |

| 2010/0177956 | A1* | 7/2010 | Cooper | G06K 9/00664 382/159 |
| 2011/0022615 | A1* | 1/2011 | Yang | G06F 17/30029 707/758 |
| 2011/0034176 | A1* | 2/2011 | Lord | G06F 17/30244 455/450 |

(Continued)

FOREIGN PATENT DOCUMENTS

WO 2013134433 A2 9/2013

OTHER PUBLICATIONS

Ma et al. (Ma08), SoRec: Social Recommendation Using Probabilistic Matrix Factorization [online], Copyright 2008 ACM [retrieved on Oct. 3, 2016]. Retrieved from the Internet:<URL:http://delivery.acm.org/10.1145/1460000/1458205/p931-ma.pdf>.*

(Continued)

*Primary Examiner* — Stanley K Hill
*Assistant Examiner* — Mikayla Chubb
(74) *Attorney, Agent, or Firm* — Garg Law Firm, PLLC; Rakesh Garg; Christopher K. McLane

(57) ABSTRACT

A method, system, and computer program product for social collaboration in probabilistic prediction are provided in the illustrative embodiments. A set of predictions is sent to a user device. A prediction in the set of predictions is a probability of an outcome of an event. The probability is computed using a prediction model trained with training data corresponding to the event. An input is received from the user device. The input comprises a new prediction made at the user device using a new prediction model executing on the user device. A difference is determined between the prediction and the new prediction. The prediction model is revised to produce a revised prediction. A revised difference between the revised prediction and the new prediction is smaller than the difference.

19 Claims, 7 Drawing Sheets

(56) References Cited

U.S. PATENT DOCUMENTS

2012/0179822 A1    7/2012  Grigsby et al.
2013/0086273 A1    4/2013  Wray et al.
2016/0307241 A1*  10/2016  Adams .................... G06Q 50/01
2017/0091645 A1*   3/2017  Matus .................... G06N 7/005

OTHER PUBLICATIONS

Koren et al, OrdRec: An Ordinal Model for Predicting Personalized Item Rating Distributions, 2011.*
Zhu et al, Predicting User Activity Level in Social Networks, 2013.*
Adhikari et al; A Novel Weighted Ensemble Technique for Time Series Forecasting, PAKDD 2012, Part I, LNAI 7301, pp. 38-49, Springer-Verlag Berlin Heidelberg, 2012.

* cited by examiner
† cited by third party

SOCIAL COLLABORATION IN PROBABILISTIC PREDICTION

TECHNICAL FIELD

The present invention relates generally to a method, system, and computer program product for predicting event outcomes. More particularly, the present invention relates to a method, system, and computer program product for social collaboration in probabilistic prediction.

BACKGROUND

Forecasting or making a prediction is an attempt to go beyond the current time horizon to provide an assertion about the future. Predicting an outcome that occurs in the future of an event is probabilistic in nature. In other words, a prediction that an event will occur, or not occur, is only indicative of a probability of the occurrence or non-occurrence of that event. The closer that probability is to 1 or one hundred percent, the more likely that event is to occur or not occur. However, whether that event actually occurs or does not occur cannot be known with certainly until the time of occurrence has passed.

Regression is a probabilistic classification model that attempts to fit probabilistic values to a graph plot, such as a line. The model plots a predictor variable and a dependent variable on the graph, and uses the graph to predict an outcome or a value of the dependent variable based on projected values of the predictor variable. An error is a value by which a forecasted outcome of a model differs from the actual outcome of the event being forecasted. A percentage error is a percentage value by which a forecasted outcome of a model differs from the actual outcome of the event being forecasted. Mean percentage error is a computed average of several measurements of a percentage error. Mean squared error is a computed average of the square of several error value measurements.

A model for predicting an outcome is called a prediction model. A prediction model (model) includes computational logic to compute the predicted outcome based on a set of inputs. Such logic includes rules, heuristics, statistical and other analytical algorithms, or a combination thereof.

A variety of prediction models are presently in use to make various types of predictions. For example, cyclical model predicts an outcome of an event based on the past outcomes of the same event that have a seasonal or periodic pattern. The cyclical model factors in the circumstances under which the event occurred in the past and the circumstances under which the event is expected to occur during the prediction period to make the prediction.

Simulation model is another example model for making predictions. The simulation model simulates in the present time the conditions under which the event will transpire in the future to reach an outcome in the present time. The outcome reached in the present time under simulated conditions forms the prediction for the event at the future time.

Extrapolation model draws educated conclusions about future conditions of the future event based on presently available information about the conditions. The extrapolation model then bases the prediction on those conclusions. Many other types of prediction models are presently in use.

SUMMARY

The illustrative embodiments provide a method, system, and computer program product for normalizing amorphous query result sets. An embodiment includes a method for social collaboration in probabilistic prediction. The embodiment sends, from an application executing in a data processing system using a processor and a memory, a set of predictions to a user device, wherein a prediction in the set of predictions is a probability of an outcome of an event, wherein the probability is computed using a prediction model trained with training data corresponding to the event. The embodiment receives an input from the user device, wherein the input comprises a new prediction made at the user device using a new prediction model executing on the user device. The embodiment determines a difference between the prediction and the new prediction. The embodiment revises the prediction model to produce a revised prediction, wherein a revised difference between the revised prediction and the new prediction is smaller than the difference.

Another embodiment includes a computer program product for social collaboration in probabilistic prediction. The embodiment further includes one or more computer-readable tangible storage devices. The embodiment further includes program instructions, stored on at least one of the one or more storage devices, to send, from an application executing in a data processing system using a processor and a memory, a set of predictions to a user device, wherein a prediction in the set of predictions is a probability of an outcome of an event, wherein the probability is computed using a prediction model trained with training data corresponding to the event. The embodiment further includes program instructions, stored on at least one of the one or more storage devices, to receive an input from the user device, wherein the input comprises a new prediction made at the user device using a new prediction model executing on the user device. The embodiment further includes program instructions, stored on at least one of the one or more storage devices, to determine a difference between the prediction and the new prediction. The embodiment further includes program instructions, stored on at least one of the one or more storage devices, to revise the prediction model to produce a revised prediction, wherein a revised difference between the revised prediction and the new prediction is smaller than the difference.

Another embodiment includes a computer system for social collaboration in probabilistic prediction. The embodiment further includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to send, from an application executing in a data processing system using a processor and a memory, a set of predictions to a user device, wherein a prediction in the set of predictions is a probability of an outcome of an event, wherein the probability is computed using a prediction model trained with training data corresponding to the event. The embodiment further includes program instructions, stored on at least one of the one or more storage devices for execution by at least one of the one or more processors via at least one of the one or more memories, to receive an input from the user device, wherein the input comprises a new prediction made at the user device using a new prediction model executing on the user device. The embodiment further includes program instructions, stored on at least one of the one or more storage devices for execution by at least one of the one or more processors via at least one of the one or more memories, to determine a difference between the prediction and the new prediction. The embodiment further includes program instructions, stored on at least one of the one or more storage devices for execution by at least one of the one or more processors via at least one of the one or more memories, to revise the prediction model to produce a revised prediction, wherein a revised difference between the revised prediction and the new prediction is smaller than the difference.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
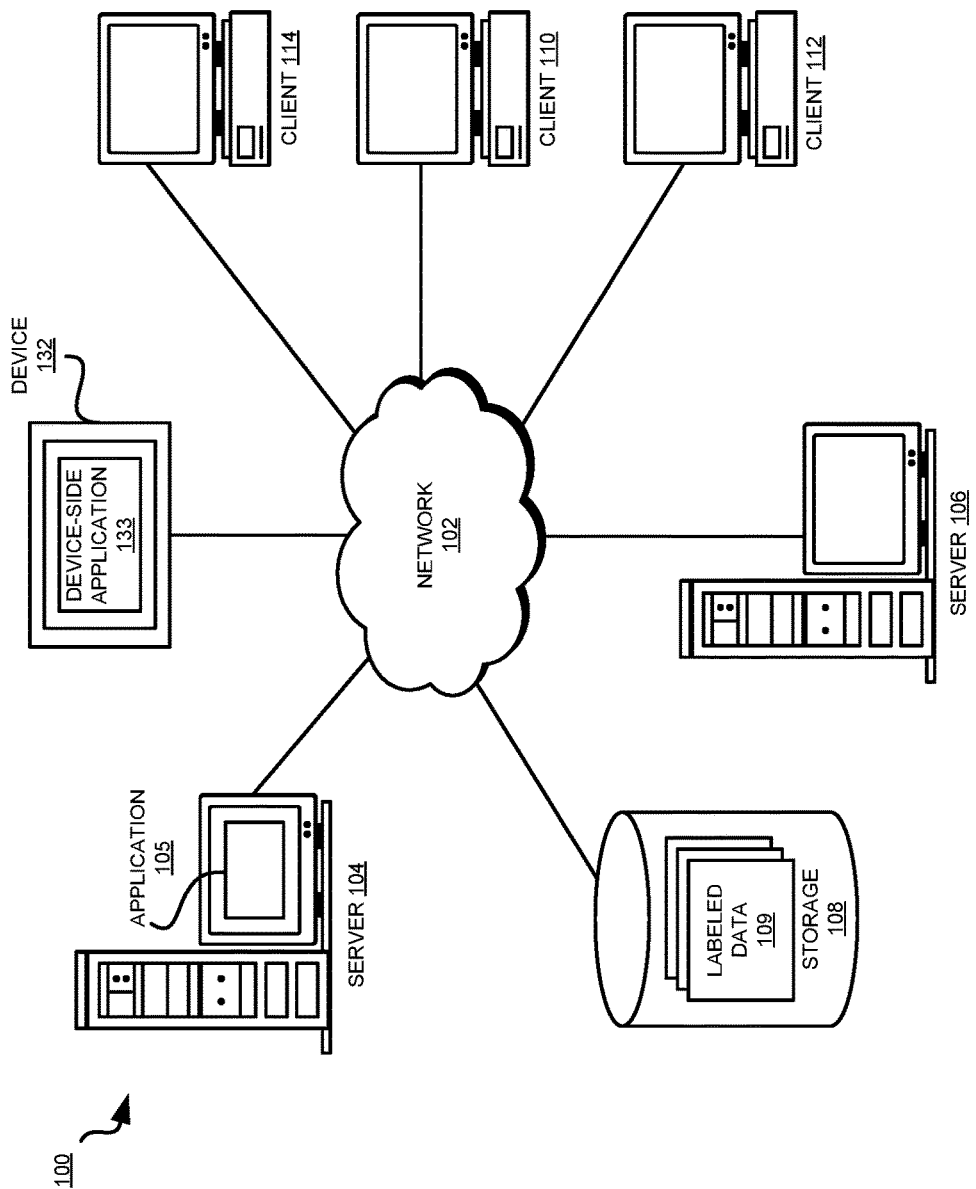
FIG. 1 depicts a block diagram of a network of data processing systems in which illustrative embodiments may be implemented.

The illustrative embodiments recognize that most presently available prediction models are preprogrammed to make predictions according to certain logic and model training. For example, when the logic of a presently used model is implemented, and the logic is trained with a set of training data, the model makes a prediction about a future event based solely on that logic and that training as applies to the input information about the future event.

Some group-based prediction models rely simply on a group consensus. In other words, the logic if such a model is simply to collect and summarize opinions of individuals, and present the summarized opinion as the prediction. In effect, such a model simply states that x number or percentage of people think the outcome will be A, y number or percentage of people think the outcome will be B, and so on.

The illustrative embodiments recognize that preprogrammed trained models as well as group-based models are separately and individually deficient in accommodating certain other prediction factors. For example, presently available models do not adjust a probability distribution of the possible outcome(s) based on inputs not considered in the training data or logic. As another example, presently available models do not value different social inputs differently to modify a prediction.

The illustrative embodiments recognize that generally, the presently available manner of making predictions does not effectively utilize inputs from individuals, to wit, social inputs, to adjust a prediction, adjust a model, or both. Generally, the presently available prediction models fail to adjust a model to shift or change a probability distribution of the possible outcome(s) based on social inputs.

The illustrative embodiments used to describe the invention generally address and solve the above-described problems and other problems related to prediction models. The illustrative embodiments provide a method, system, and computer program product for social collaboration in probabilistic prediction.

An embodiment produces a set of one or more predictions about an event, such as by using one or more models in an ensemble. The embodiment allows a user to input a vote on a prediction, a new prediction, or both. The embodiment then uses the input to modify the prediction, the model that produced the prediction, the set of predictions, the ensemble of models that produced the set of predictions, or a combination thereof.

Another embodiment further considers a weight of the input according to a classification or category to which the input-providing user belongs. For example, an input from an expert in the subject matter domain of the event being predicted carries more weight than an input from a layperson in the subject matter domain. An embodiment provides a technique for categorizing users into various categories for such use.

An embodiment stores user inputs in a repository. One embodiment uses the repository to re-categorize users from time to time. Another embodiment uses the repository to retrain an existing model.

The illustrative embodiments are described with respect to, certain models, events, inputs, structures, types of predictions, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments.

Additional or different advantages may be realized by specific illustrative embodiments. Furthermore, a particular illustrative embodiment may have some, all, or none of the advantages listed above.

Figure 2:
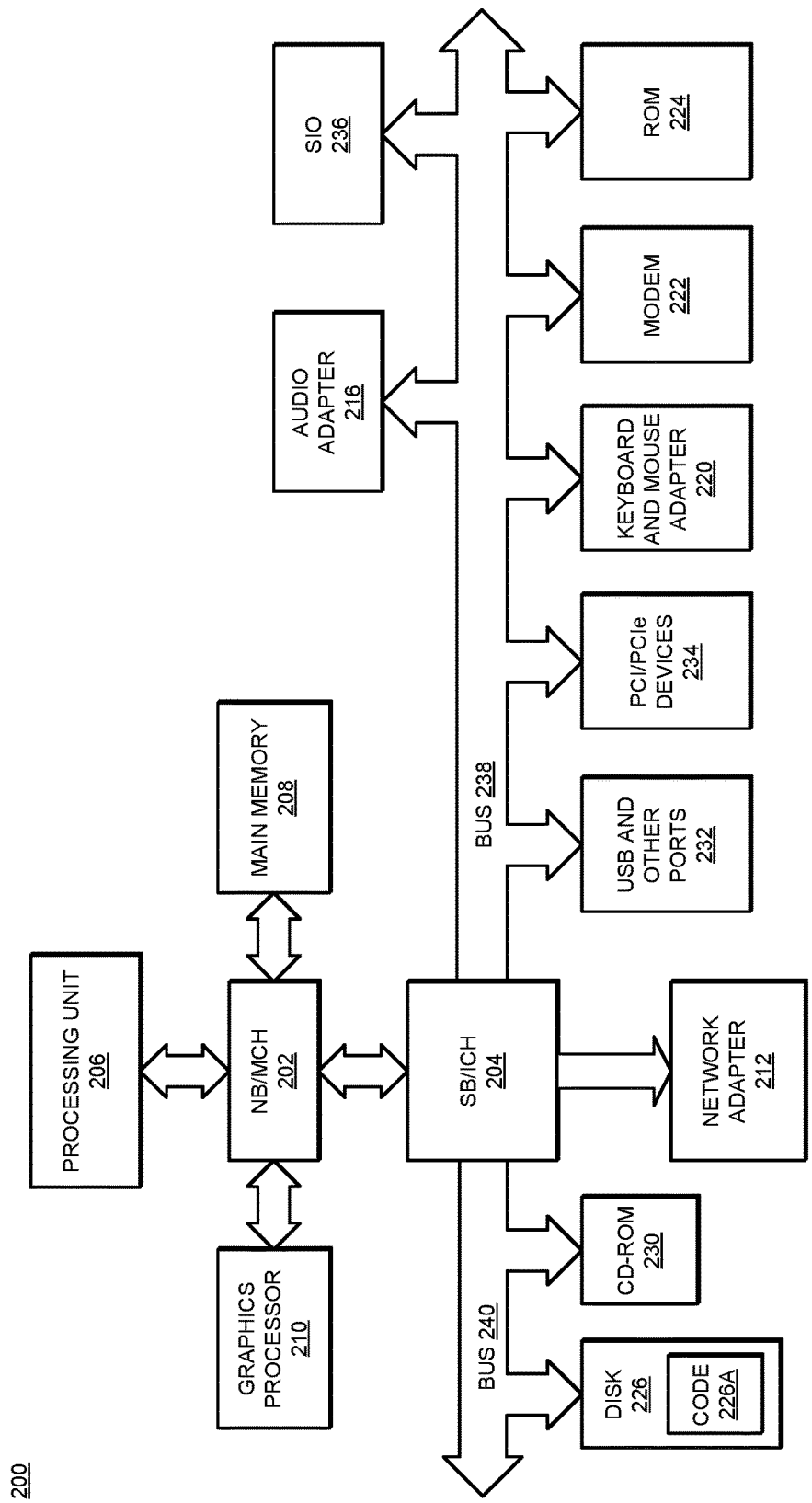
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Application 105 in server 104 implements an embodiment described herein. Labeled data 109 is a collection of user inputs where the user inputs have been represented in a form usable by an embodiment. Device 132 is a computing platform, such as a tablet device, smartphone device, or generally any data processing system that a user uses to receive predictions and provide user inputs as described herein. Device-side application 133 executes in device 132 to facilitate the user's interactions with application 105. In one embodiment, a user can use client 114 in the manner of device 132, using an application (not shown) that can perform the functions of device-side application 133 on client 114.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments. Data processing system 200 is also representative of device 132 on which application 133 of FIG. 1 executes. Computer usable program code or instructions implementing the processes of the illustrative embodiments may be located on such onboard system or device. Data processing system 200 is also representative of an embedded, removable, or mobile computing device, such as an example implementation of a communication device, navigation device, or a combination thereof, that can be associated with device 132 to execute application 133 in FIG. 1, in which computer usable program code or instructions implementing the processes for using an illustrative embodiment may be located. Data processing system 200 is described as a computer only as an example, without being limited thereto. Implementations in the form of device 132, or another device containing instructions of all or part of application 133 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 and device-side application 133 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
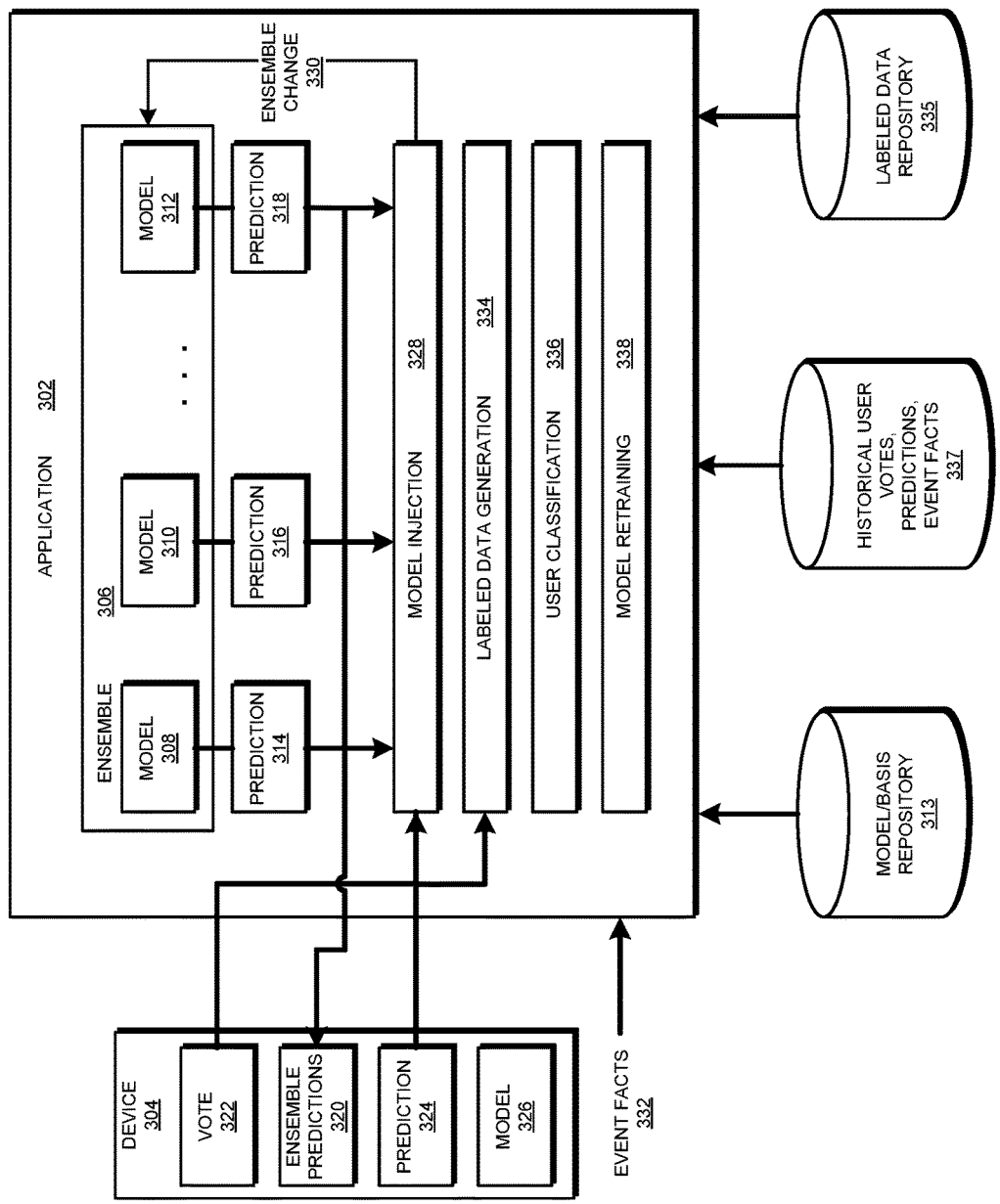
FIG. 3 depicts a block diagram of a configuration for social collaboration in probabilistic prediction in accordance with an illustrative embodiment.

With reference to FIG. 3, this figure depicts a block diagram of a configuration for social collaboration in probabilistic prediction in accordance with an illustrative embodiment. Application 302 is an example of application 105 in FIG. 1. Device 304 is an example of device 132 in FIG. 1.

Application 302 executes ensemble 306 of one or more prediction models, such as models 308, 310, and 312. Typically, when multiple models are used in an ensemble, the models are of different types from one another. For example, as depicted, each of models 308, 310, and 312 is of a different type. Furthermore, each of models 308, 310, and 312 is a preprogrammed model such that the model implements logic that is trained with a set of training data.

Repository 313 can be any number of data repositories operating towards a common purpose of providing models 308, 310, and 312, and other models in ensemble 306. For example, repository 313 stores and supplies the configuration information for models used n ensemble 306, and the training data used to train one or more of those models.

A set of models in ensemble 306 produce a corresponding set of predictions. For example, model 308 produces prediction 314, model 310 produces prediction 316, and model 312 produces prediction 318. The set of predictions 314, 316, and 318 is presented to a user, such as on device 304 in the form of ensemble predictions 320. Application 133 in FIG. 1 can be used for presenting ensemble predictions 320.

A user of device 304 provides one or more inputs using application 133 in FIG. 1. One such input is vote 322 on a prediction in ensemble predictions 320. The user can vote on any number of predictions in ensemble predictions 320 within the scope of the illustrative embodiments.

A vote, such as vote 322 is an indication of the user's confidence in the probability associated with a prediction in ensemble predictions 320. In some cases, vote 322 has a nominal value to indicate acceptance or rejection of the prediction, such as binary values 1 or 0, yes, or no, agree or disagree. In other cases, vote 322 has an ordinal value to indicate a degree of agreement or disagreement with the prediction. Some examples of an ordinal vote value are, 80 percent agree, right in some cases, not accurate by 3 units of measurement, ten more than predicted, and so on.

Another user input from device 304, such as by using application 133 in FIG. 1, is prediction 324. Prediction 324 is a prediction generated by the user, on device 304, using model 326, which executes on device 304. Model 304 is a model known to the user of device 304 but not known to application 304 or ensemble 306. Furthermore, the manner of constructing model 326, any data that forms the basis for model 326, any training of model 326, and other such factors of model 326 are similarly unknown to application 302 and ensemble 306.

Device 304 communicates vote 322, prediction 324, or both to application 302. Model injection component 328 receives the user inputs and causes ensemble change 330. For example, model injection component 328 uses the inputs to influence a model used in ensemble 306, a probability density function based on which the model made the prediction that is the subject of vote 322, or a combination thereof.

An example of such an influence is the change in a function parameter of a model, for example, model 308, which changes the probability density function corresponding to the prediction. Another example of such an influence is replacing, omitting, or adding a model to ensemble 306.

Another example of such an influence is changing, in a model, a weight of a factor related to the event being predicted. For example, suppose that the user indicates with vote 322 a reason or fact why the user voted a certain way, or that certain features or facts about the event are available in the form of event facts 332, or both. In one embodiment, model injection component 328 identifies factors in a model in ensemble that considers those facts in the model's prediction function. Model injection component 328 then changes a weight of that factor in the prediction function, such as by increasing or decreasing the weight, so that the prediction generated by the modified prediction function reflects a change suggested by the vote value.

For example, suppose the event is a golfing tournament, and the prediction is of an amount of time a particular player will take to reach a particular hole. Suppose a prediction in ensemble prediction 320 provides a prediction of 17 minutes. A user can vote nominally, saying that the user does not agree with the prediction. The user can also vote ordinally, saying that the user does not agree and the time will be 20 minutes due to rain at the tournament location.

For the nominal vote, component 328 can simply try to weigh the rain factor higher into a prediction model than before, to produce a revise prediction, which might simply replace the older prediction of 17 minutes. For the ordinal vote, component 328 tries to weigh the rain factor such that the revised prediction is closer to 20 minutes.

In one embodiment, ensemble change 330 occurs when more than one device 304 provide votes in this manner. In another embodiment, ensemble change 330 causes a prediction, such as prediction 314, to change to match prediction 326 supplied by the user. In another embodiment, ensemble change 330 occurs when a threshold number of user votes or user predictions differ from the prediction from ensemble 306 by more than a threshold amount or degree.

User input data registered in a reusable form and identifiable with the user or the user's category is called labeled data. For example, the vote value of vote 322, the user's prediction value, and prediction factors in prediction 324 can be stored for retraining a model, such as retraining model 308.

Figure 4:
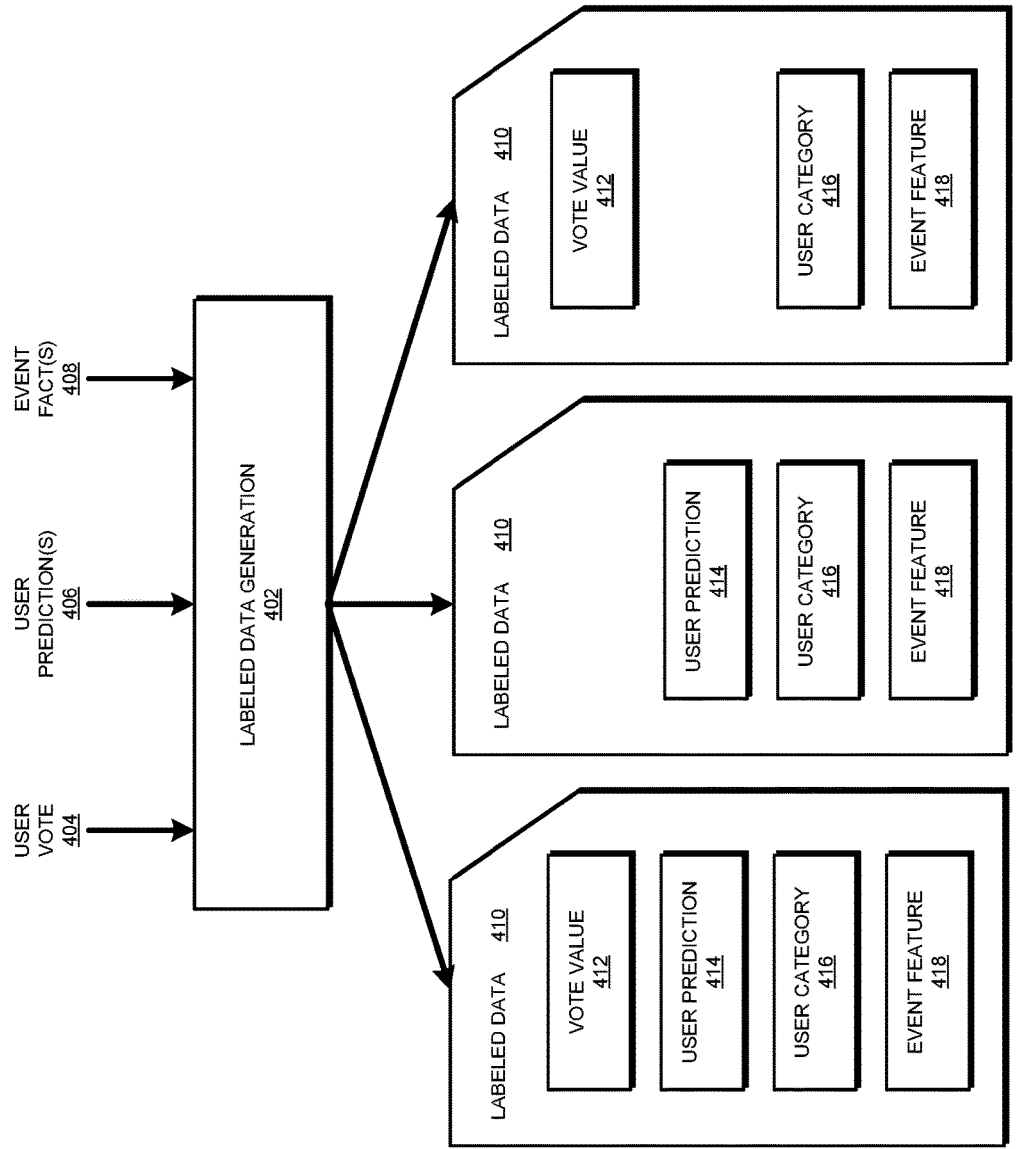
FIG. 4 depicts a block diagram of an example labeled data in accordance with an illustrative embodiment.

Labeled data generation component 334 manipulates vote 322, prediction 324, an event factor supplied with prediction 324, a fact from event facts 332 that corresponds with prediction 324, or a combination thereof, in a suitable form to store as a labeled data instance. FIG. 4 provides an example embodiment of labeled data. Repository 335 stores the labeled data instances created from socially collected similar inputs from one or more users.

User classification component 336 categorizes the users who provide votes, predictions, or both. For example, the user inputs along with event facts 332 related to those inputs are stored in historical repository 337. For example, historical repository 337 maintains a historical record of how a user predicted an event in the past would transpire, how the user voted on a prediction from ensemble 306 about that event, what were the factors affecting that event at that time, and how the even actually transpired.

From time to time, component 336 compares a user's predictions and vote with the actual outcomes of events over a past period. Depending upon the collective accuracy of the user's predictions, votes, or a combination thereof, in view of the actual outcomes, component 336 assigns or re-assigns the user to a category.

For example, in one embodiment, if the user predicted the outcomes correctly between 90 percent and 100 percent of times over the period in question, the user is assigned to the highest or first category in the categories of subject matter experts; if the user predicted the outcomes correctly between 70 percent and 89 percent of times over the period in question, the user is assigned to the next highest or second category in the categories of subject matter experts, and so on. If the user predicted the outcomes correctly between 0 percent and 29 percent of times over the period in question, the user is assigned to the layperson category.

Model retraining component 338 uses labeled data from repository 335 to retrain a model stored in repository 313. For example, from time to time, component 338 trains or retrains the logic, the probability function, or both, of a model whose configuration stored in repository. The retraining uses the labeled data, which as described earlier, can contain predictions of values different from a previous prediction made by the model for a given event. The retraining by component 338 using labeled data allows adjustments to prediction models to become more accurate, precise, repeatable, or a combination thereof, as compared to a previous level of accuracy, precision, or repeatability.

Furthermore, in one embodiment, component 338 selects certain labeled data and rejects certain labeled data for retraining a model. For example, in one retraining operation for a model, component 338 may select only that labeled data that was created from the inputs of a user with at least a certain level of expertise in the subject matter domain of certain events for which the model makes predictions.

The specific operations and the specific components to perform those operations are provided only as examples to clearly describe various embodiments. Those of ordinary skill in the art will be able to conceive from this disclosure other similar operations and other configurations to perform these and other similar operations, and the same are contemplated within the scope of the illustrative embodiments.

With reference to FIG. 4, this figure depicts a block diagram of an example labeled data in accordance with an illustrative embodiment. Labeled data generation component 402 is an example of component 334 in FIG. 3. User vote 404 is an example of vote 322, user prediction(s) 406 is an example of prediction 324, and event fact(s) 408 is an example of event facts 332 in FIG. 3. Once created, labeled data 410 can be stored in repository 335 of FIG. 3.

In one embodiment, labeled data comprises at least three parts. In one embodiment, vote value 412 is an actual vote value provided by the user, such as user vote 404. In another embodiment, vote value 412 is a value derived from a different user input, such as from user prediction 406, which either agrees with an ensemble prediction, disagrees with the ensemble prediction, or agrees/disagrees with the ensemble prediction by a certain degree.

Similarly, in one embodiment, user prediction 414 is an actual prediction, such as user prediction 406 provided by the user from a model executing on a user's data processing system, such as on device 304 in FIG. 3. In another embodiment, user prediction 414 is derived from another user input, such as from user vote 404. For example, if the user voted in full or partial disagreement with an ensemble prediction, the vote is an indicator of a user prediction contrary to the ensemble prediction to some extent. In certain cases, such indication is sufficient for conclude how the user may have predicted the outcome of the same event.

In one embodiment, only component 412 or 414 are present in labeled data 410. In another embodiment, both components 412 or 414 are present in labeled data 410.

User category 416 stores the category assigned to the user whose data is stored in components 412 and 414. The manner of assigning categories is described with respect to FIG. 3 above. In one embodiment, a previously assigned category is stored in repository 337, or in a previously generated labeled data for the user, and is reused in labeled data 410 under construction. In another embodiment, a user category is computed by component 336 on demand at the time of constructing labeled data 410.

Event feature 418 is a component of event fact 408 and affects an outcome of an event. In one embodiment, event feature 418 is provided in event fact 408. For example, event fact 408 may provide that the precipitation was 0.5 inches during a golfing tournament event. The rain in that amount becomes event feature 418. In another embodiment, event feature 418 is computed or derived from event fact 408. For example, event fact 408 may provide that the precipitation was 0.5 inches during a golfing tournament event. An embodiment references another data source to establish that the precipitation was in the form of rain and not snow, and that the precipitation of 0.5 inches was actually measured five miles away the golf course before the rain in a different computed or derived amount becomes event feature 418.

Figure 5:
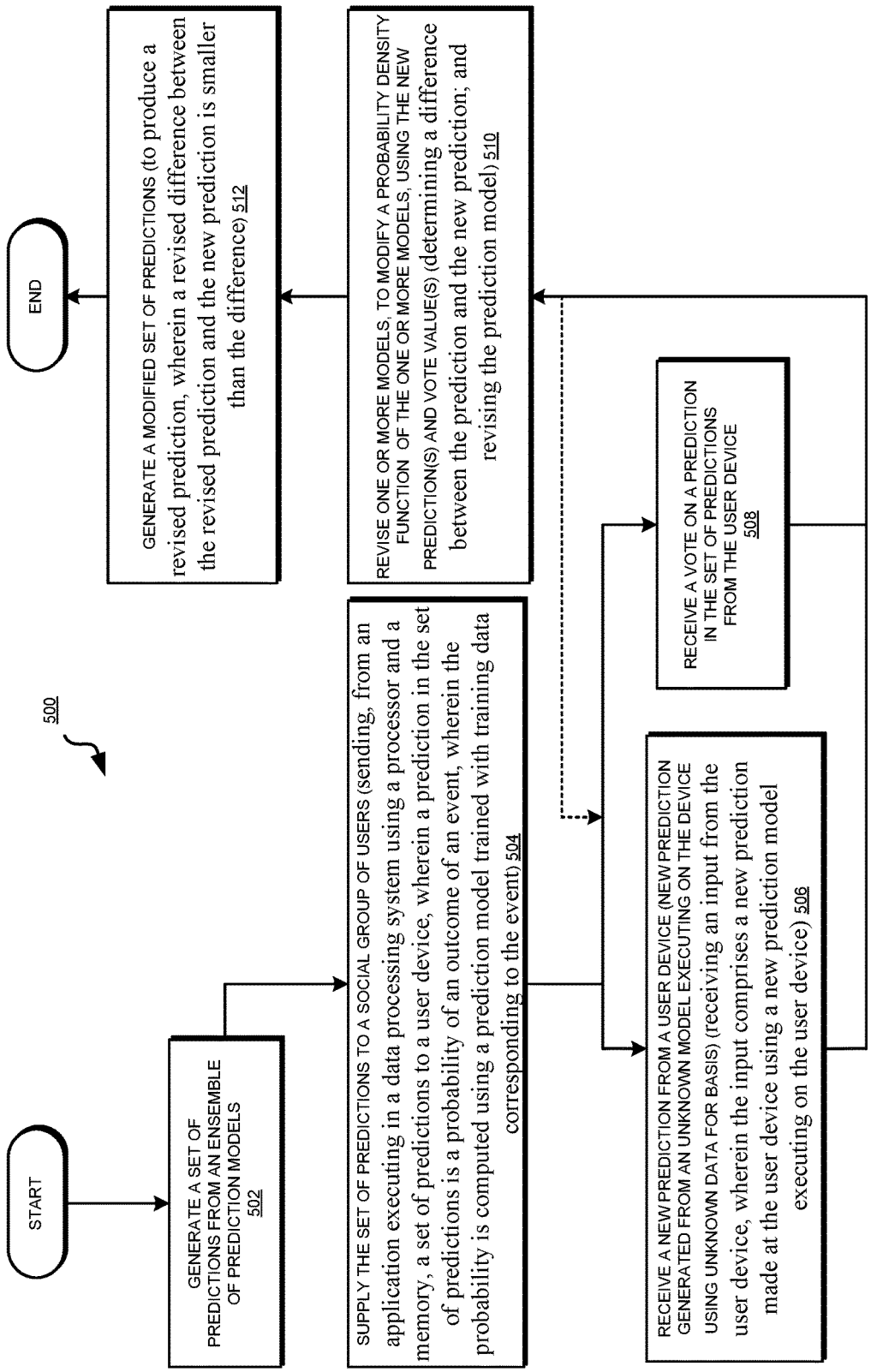
FIG. 5 depicts a flowchart of an example process for social collaboration in probabilistic prediction in accordance with an illustrative embodiment.

With reference to FIG. 5, this figure depicts a flowchart of an example process for social collaboration in probabilistic prediction in accordance with an illustrative embodiment. Process 500 can be implemented in application 402 in FIG. 4.

The application generates a set of predictions from an ensemble of prediction models (block 502). The application supplies the set of predictions to a social group of users (block 504).

The application may receive a vote, a prediction, or both from a user. For example, the application receives a new prediction from a user device where the new prediction is generated from an unknown model executing on the user device using unknown data for the basis of the model (block 506). The application may additionally, or instead, receive a vote on a prediction in the set of predictions from the user device (block 508). The application may repeat blocks 506 and/or 708 to receive a vote in the manner of block 508, a prediction in the manner of block 506, or a combination thereof, from more than one user.

The application revises a model in the ensemble to modify a probability density function used by the model to generate a prediction (block 510). The application may revise more than one model in the manner of block 510. The application generates a modified set of predictions using the modified model from block 510 (block 512). The application ends process 500 thereafter.

Figure 6:
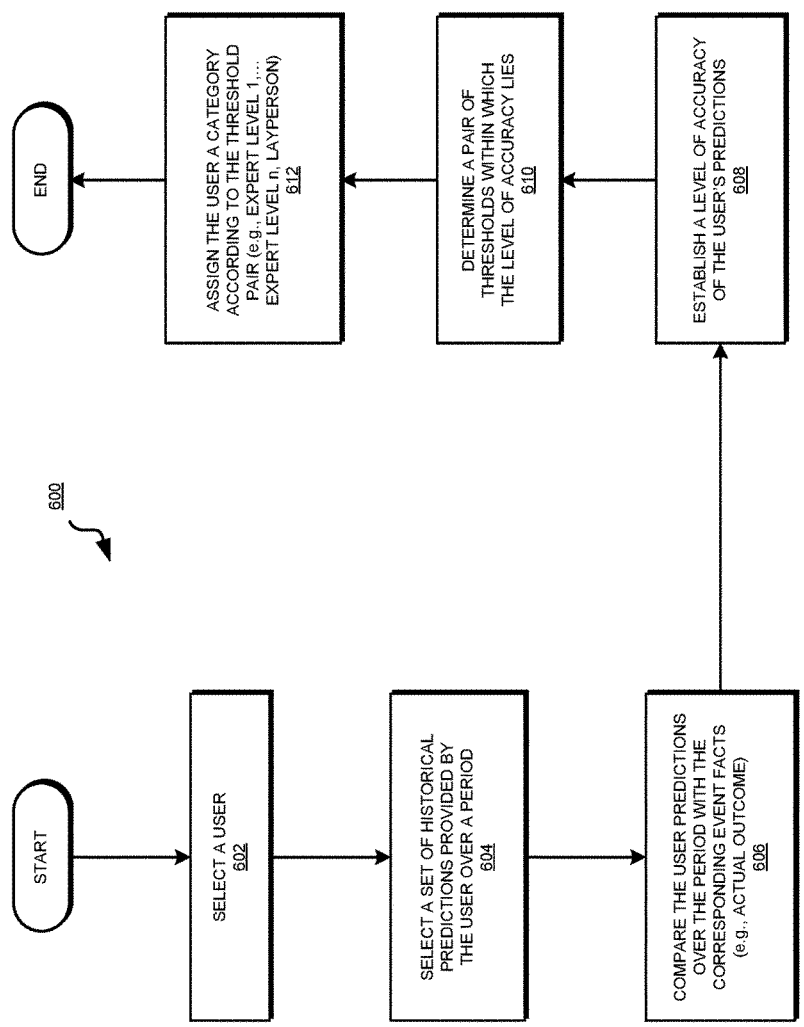
FIG. 6 depicts a flowchart of an example process for user classification in accordance with an illustrative embodiment.

With reference to FIG. 6, this figure depicts a flowchart of an example process for user classification in accordance with an illustrative embodiment. Process 600 can be implemented in application 402 in FIG. 4.

The application selects a user (block 602). The application selects a set of historical predictions provided by the user (block 604). In one embodiment, the application can use historical votes provided by the user in block 604 as described elsewhere in this disclosure.

The application compares the user's historical predictions over a period with the corresponding event facts, such as actual outcomes of the events where the user offered those historical predictions (block 606). The application establishes a level of accuracy of the user's predictions, such as by determining how many predictions match the corresponding actual outcomes (block 608).

The application determines a pair of thresholds within which the level of accuracy lies (block 610). The application may use any number of thresholds to define any number of categories. In one embodiment, the application compares the level of accuracy to only one threshold in block 610.

The application assigns the user to a category according to the threshold or threshold pair of block 610 (block 612). The application ends process 600 thereafter, or repeats process 600 for another user.

Figure 7:
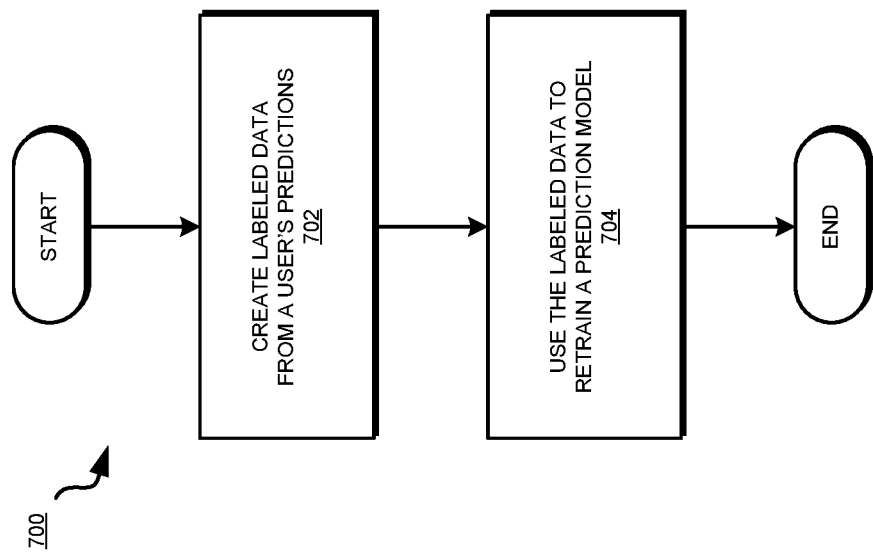
FIG. 7 depicts a flowchart of an example process for retraining a prediction model in accordance with an illustrative embodiment.

With reference to FIG. 7, this figure depicts a flowchart of an example process for retraining a prediction model in accordance with an illustrative embodiment. Process 700 can be implemented in application 402 in FIG. 4.

The application creates labeled data, for example, in the manner described with respect to FIGS. 3 and 4 (block 702). The application uses the labeled data to retrain a prediction model, such as to modify a probability density function used in the model (block 704). The application ends process 700 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for social collaboration in probabilistic prediction.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for social collaboration in probabilistic prediction, the method comprising:
   sending, from an application executing in a data processing system using a processor and a memory, a set of predictions to a user device, wherein a prediction in the set of predictions is a probability of an outcome of an event, wherein the probability is computed using a prediction model trained with training data corresponding to the event;
   receiving an input from the user device, wherein the input comprises a new prediction made at the user device using a new prediction model executing on the user device;
   determining a difference between the prediction and the new prediction; and
   revising the prediction model to produce a revised prediction, wherein a revised difference between the revised prediction and the new prediction is smaller than the difference and wherein the difference exceeds a threshold.

2. The method of claim 1, further comprising:
   collecting a set of inputs from a set of user devices, wherein the set of inputs provide a corresponding set of new predictions, the set of user devices including the user device, and the set of new predictions including the new prediction;
   determining whether a subset of the set of inputs identify the difference, wherein a number of inputs in the subset exceeds a threshold number; and
   performing the revising responsive to the subset of the set of inputs identifying the difference.

3. The method of claim 1, further comprising:
   determining a category assigned to a user providing the new prediction from the user device; and
   performing the revising responsive to the category exceeding a threshold category.

4. The method of claim 3, wherein the category is indicative of a level of expertise of the user about the event.

5. The method of claim 1, further comprising:
storing the input as labeled data, wherein the labeled data comprises:
a value derived from the input,
a category assigned to a user providing the input from the user device; and
a fact that affects the outcome of the event and where the fact has been used in the new prediction.

6. The method of claim 5, wherein the labeled data further comprises:
a second value computed from a vote provided by the user, wherein the vote comprises an ordinal value indicative of the difference.

7. The method of claim 5, further comprising:
retraining the prediction model using the labeled data, the retraining forming a retrained prediction model, wherein the retrained prediction model produces a post-retraining prediction by changing a weight associated with the fact in the prediction model, and wherein a post-retraining difference between the post-retraining prediction and the new prediction is smaller than the difference.

8. The method of claim 1, further comprising:
comparing a set of previous inputs with a corresponding set of actual outcomes of a corresponding set of previous events, wherein the set of previous inputs is stored in a historical repository of inputs, wherein the input is provided by a user of the user device towards the event and a previous input in the set of previous inputs is provided by the user towards a previous event, wherein the event and the previous event are of a common type;
determining a degree of match between outcomes predicted in the set of previous inputs and the set of actual outcomes;
selecting a category corresponding to a threshold degree of match, wherein the degree of match exceeds the threshold degree of match; and
assigning the user to the category.

9. The method of claim 8, further comprising:
adding the input to the set of previous inputs to form a revised set of previous inputs;
adding an outcome of the event to the set of actual outcomes;
determining a revised degree of match between outcomes predicted in the revised set of previous inputs and the set of actual outcomes;
selecting a new category corresponding to a new threshold degree of match, wherein the revised degree of match exceeds the new threshold degree of match; and
assigning the user to the new category.

10. The method of claim 1, wherein the input further comprises a vote on the prediction, wherein vote comprises one of (i) a binary value indicative of an agreement of a user with the prediction, and (ii) an ordinal value indicative of the difference.

11. The method of claim 1, wherein the new prediction model is unknown in the application, and wherein the new prediction model is trained using training data available at the user device.

12. The method of claim 1, further comprising:
selecting a set of prediction models, wherein a first prediction model in the set of prediction models is trained to predict the outcome of the event using a first algorithm and a second prediction model in the set of prediction models is trained to predict the outcome of the event using a second algorithm; and
generating the set of predictions in an ensemble of prediction models.

13. A computer program product comprising one or more computer-readable tangible storage devices and computer-readable program instructions which are stored on the one or more storage devices and when executed by one or more processors, perform the method of claim 1.

14. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

15. A computer program product for social collaboration in probabilistic prediction, the computer program product comprising:
one or more computer-readable tangible storage devices;
program instructions, stored on at least one of the one or more storage devices, to send, from an application executing in a data processing system using a processor and a memory, a set of predictions to a user device, wherein a prediction in the set of predictions is a probability of an outcome of an event, wherein the probability is computed using a prediction model trained with training data corresponding to the event;
program instructions, stored on at least one of the one or more storage devices, to receive an input from the user device, wherein the input comprises a new prediction made at the user device using a new prediction model executing on the user device;
program instructions, stored on at least one of the one or more storage devices, to determine a difference between the prediction and the new prediction; and
program instructions, stored on at least one of the one or more storage devices, to revise the prediction model to produce a revised prediction, wherein a revised difference between the revised prediction and the new prediction is smaller than the difference, and wherein the difference exceeds a threshold amount of the difference.

16. The computer program product of claim 15, further comprising:
program instructions, stored on at least one of the one or more storage devices, to collect a set of inputs from a set of user devices, wherein the set of inputs provide a corresponding set of new predictions, the set of user devices including the user device, and the set of new predictions including the new prediction;
program instructions, stored on at least one of the one or more storage devices, to determine whether a subset of the set of inputs identify the difference, wherein a number of inputs in the subset exceeds a threshold number; and
program instructions, stored on at least one of the one or more storage devices, to perform the revising responsive to the subset of the set of inputs identifying the difference.

17. The computer program product of claim 15, further comprising:
program instructions, stored on at least one of the one or more storage devices, to determine a category assigned to a user providing the new prediction from the user device; and program instructions, stored on at least one of the one or more storage devices, to perform the revising responsive to the category exceeding a threshold category.

18. The computer program product of claim 17, wherein the category is indicative of a level of expertise of the user about the event.

19. A computer system for social collaboration in probabilistic prediction, the computer system comprising:

one or more processors, one or more computer-readable memories and one or more computer-readable tangible storage devices;

program instructions, stored on at least one of the one or more storage devices for execution by at least one of the one or more processors via at least one of the one or more memories, to send, from an application executing in a data processing system using a processor and a memory, a set of predictions to a user device, wherein a prediction in the set of predictions is a probability of an outcome of an event, wherein the probability is computed using a prediction model trained with training data corresponding to the event;

program instructions, stored on at least one of the one or more storage devices for execution by at least one of the one or more processors via at least one of the one or more memories, to receive an input from the user device, wherein the input comprises a new prediction made at the user device using a new prediction model executing on the user device;

program instructions, stored on at least one of the one or more storage devices for execution by at least one of the one or more processors via at least one of the one or more memories, to determine a difference between the prediction and the new prediction; and program instructions, stored on at least one of the one or more storage devices for execution by at least one of the one or more processors via at least one of the one or more memories, to revise the prediction model to produce a revised prediction, wherein a revised difference between the revised prediction and the new prediction is smaller than the difference, and wherein the difference exceeds a threshold amount of the difference.

* * * * *